(No Model.)
W. T. SNYDER.
SELF LUBRICATING CAR WHEEL.
No. 603,291. Patented May 3, 1898.
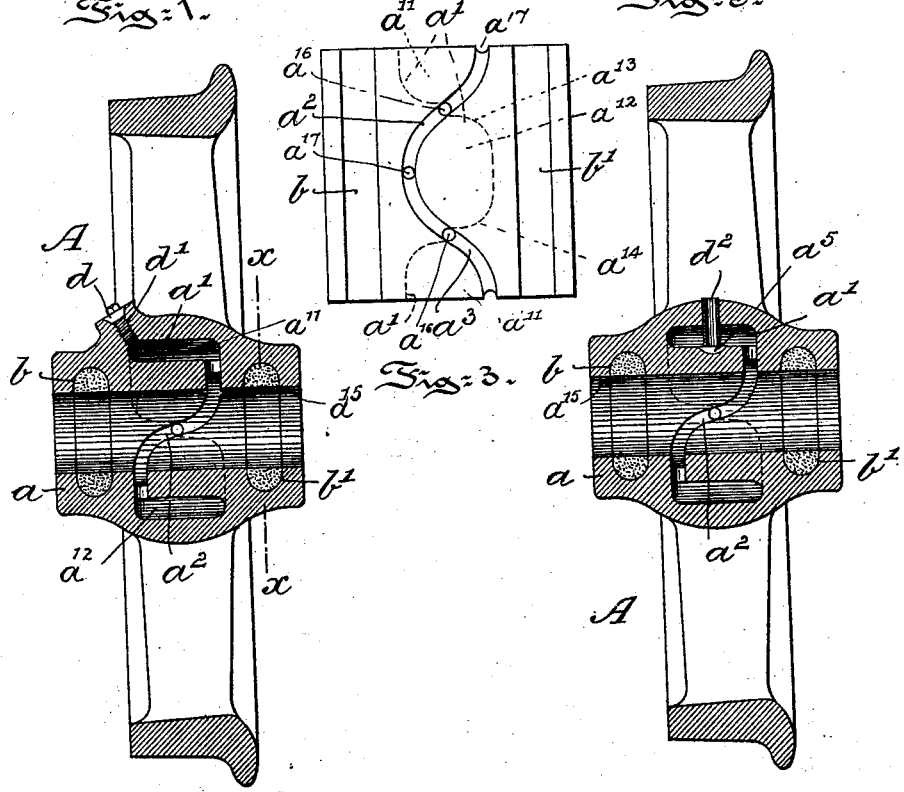
Witnesses:
Thomas M. Smith.
Richard C. Maxwell.
Inventor:
William T. Snyder,
By J. Walter Douglas,
Attorney.

UNITED STATES PATENT OFFICE.

WILLIAM T. SNYDER, OF CATASAUQUA, PENNSYLVANIA, ASSIGNOR OF ONE-HALF TO JAMES W. FULLER, OF SAME PLACE.

SELF-LUBRICATING CAR-WHEEL.

SPECIFICATION forming part of Letters Patent No. 603,291, dated May 3, 1898.

Application filed November 22, 1897. Serial No. 659,371. (No model.)

*To all whom it may concern:*

Be it known that I, WILLIAM T. SNYDER, a citizen of the United States, residing at Catasauqua, in the county of Lehigh and State of Pennsylvania, have invented certain new and useful Improvements in Self-Lubricating Car-Wheels, of which the following is a specification.

My invention has relation to a self-lubricating wheel or pulley, and in such connection it relates particularly to the construction and arrangement of the hub of such a wheel or pulley.

The principal object of my invention is to provide a wheel or pulley having a hub in which is formed a lubricating-chamber divided into two compartments and having two points of inlet into an irregular-shaped groove or duct formed in the bearing-surface of the hub, said groove or duct having also two points of outlet leading to the compartments of the lubricating-chamber, whereby during the rotation of the wheel or pulley the lubricant is forced from the compartments to the duct and from the duct to the compartments, thereby forming a constant circulation of the lubricant.

My invention consists of a wheel or pulley provided with a hub having an internal lubricating-chamber divided into two compartments by converging or "break" walls, said hub being provided with an irregular groove or duct provided in its bearing-surface and said groove or duct being provided with two sets of perforations, one set leading from the groove or duct to the points of junction of the two compartments of the lubricating-chamber and the other set leading from the groove or duct directly to each compartment of said chamber.

My invention further consists of a self-lubricating wheel or pulley constructed and arranged in substantially the manner hereinafter described and claimed.

The nature and scope of my invention will be more fully understood from the following description, taken in connection with the accompanying drawings, forming part hereof, in which—

Figure 1 is a vertical central section of a wheel and hub embodying main features of my invention. Fig. 2 is a front elevation of said wheel with the hub in section to show the arrangement of the compartments of the lubricating-chamber and the openings leading from the same to the groove or duct formed in the bearing-surface of the hub. Fig. 3 is a diagrammatic view of the internal groove or duct when projected upon a flat surface. Fig. 4 is a vertical sectional view on the line $xx$ of Fig. 1; and Fig. 5 is a vertical sectional view of a wheel and hub, showing a modification of my invention.

Referring to the drawings, A represents a wheel, or, if desired, a pulley, having a hub $a$, which, as shown, may be open at both ends. In the hub $a$ is formed a lubricating-chamber $a'$, formed of two compartments $a^{11}$ and $a^{12}$, as indicated in dotted lines in Fig. 3 and full lines in Fig. 2. These compartments at their two points of junction have converging or break walls $a^{13}$ and $a^{14}$. In the bearing-surface $a^{15}$ of the hub $a$ is formed an irregular-shaped groove or duct $a^2$ and $a^3$. This groove or duct $a^2$ and $a^3$ communicates with the compartments $a^{11}$ and $a^{12}$, at the points of junction of the same, by means of two perforations $a^{16}$, and it also communicates with each compartment by means of the perforations $a^{17}$, one of which leads from one portion $a^2$ of the groove to the compartment $a^{11}$ and the other leads from the portion $a^3$ to the other compartment $a^{12}$, as more particularly illustrated in Figs. 2 and 3. As shown in Fig. 1, from one compartment $a^{11}$ extends an opening $d'$, leading to the exterior of the hub $a$ and forming an entrance for the lubricant. This opening $d'$ is adapted to be closed by a screw-plug $d$.

In Fig. 5 the compartment $a^{11}$ is provided with a hollow or depression $a^5$, and above this depression is arranged an open tube or pipe $d^2$, extending through the hub $a$ to the exterior thereof. With this form of opening no plug is required, for the reason that the lower end of the pipe $a^5$, extending, as it does, within the compartment $a^{11}$ and to the depression $a^5$, is sealed by the oil in the compartment, which prevents during the rotation of the hub the escape of oil therethrough. In the bearing-surface $a^{15}$ of the hub $a$ are formed two annular grooves $b$ and $b'$, adapted to receive a suitable packing to absorb and prevent the escape of the lubricant along the inserted axle or journal through the open ends of the hub $a$.

Having thus described the nature and objects of my invention, what I claim as new, and desire to secure by Letters Patent, is—

In a self-lubricating wheel or pulley, a hub having an internal lubricating-chamber divided into two compartments, the points of junction of which are formed by converging or break walls, said hub having in its bearing-surface an irregular-shaped groove or duct, said duct communicating by two sets of perforations with the lubricating-chamber, one set of perforations leading to the points of junction of the two compartments of said chamber and the other set leading directly to each compartment, whereby during the rotation of the hub the lubricant is first conducted by the break walls into the groove or duct and thereafter by centrifugal force is conducted from said groove or duct directly to the compartments of the lubricating-chamber, substantially as and for the purposes described.

In testimony whereof I have hereunto set my signature in the presence of two subscribing witnesses.

WILLIAM T. SNYDER.

Witnesses:
A. N. ULRICH,
H. J. REINHARD.